US008681201B2

(12) United States Patent
 Leclerc et al.

(10) Patent No.: US 8,681,201 B2
(45) Date of Patent: Mar. 25, 2014

(54) VIDEOCONFERENCING COMMUNICATION DEVICE AND METHOD

(75) Inventors: Brice Leclerc, Nozay (FR); Olivier Marce, Nozay (FR)

(73) Assignee: Alcatel Lucent, Paris (FR)

( * ) Notice: Subject to any disclaimer, the term of this patent is extended or adjusted under 35 U.S.C. 154(b) by 298 days.

(21) Appl. No.: 13/128,166

(22) PCT Filed: Dec. 10, 2009

(86) PCT No.: PCT/FR2009/052474
 § 371 (c)(1),
 (2), (4) Date: May 26, 2011

(87) PCT Pub. No.: WO2010/067026
 PCT Pub. Date: Jun. 17, 2010

(65) Prior Publication Data
 US 2012/0127260 A1 May 24, 2012

(30) Foreign Application Priority Data

Dec. 10, 2008 (FR) ...................................... 08 58422

(51) Int. Cl.
 *H04N 7/14* (2006.01)
(52) U.S. Cl.
 USPC .................................... 348/14.07; 348/14.01
(58) Field of Classification Search
 USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16
 See application file for complete search history.

(56) References Cited

U.S. PATENT DOCUMENTS

| 4,099,179 | A   | * | 7/1978  | Hofstein ....................... 342/185 |
|-----------|-----|---|---------|---------------------------------|
| 5,949,474 | A   | * | 9/1999  | Gerszberg et al. ......... 348/14.01 |
| 6,215,515 | B1  | * | 4/2001  | Voois et al. ................ 348/14.01 |
| 6,285,405 | B1  |   | 9/2001  | Binford, Jr. et al. |
| 6,292,210 | B1  | * | 9/2001  | Gerszberg et al. ......... 348/14.01 |
| 7,982,762 | B2  | * | 7/2011  | Chatting et al. ........... 348/14.07 |
| 8,237,764 | B1  | * | 8/2012  | Chen et al. ................. 348/14.01 |
| 2005/0094578 | A1 |  | 5/2005 | Pasha et al. |
| 2008/0058643 | A1 | * | 3/2008 | Hashimoto et al. .......... 600/437 |
| 2010/0157015 | A1 | * | 6/2010 | Read ......................... 348/14.08 |

* cited by examiner

*Primary Examiner* — Khai N Nguyen
(74) *Attorney, Agent, or Firm* — Harness, Dickey & Pierce

(57) ABSTRACT

The device for videoconferencing between a local user (1) and at least one remote user (3) comprises a screen (7) capable of displaying to the local user (1) an image of the remote user (I3), and an image sensor (9) capable of receiving an image from the local user (I1) to be transmitted to the remote user (3). The device further comprises a delaying unit (14) capable of applying a chosen delay (R) to the image (I1) of the local user (1) coming from the local image sensor, the screen (7) being capable of showing the local user (1) the image of the local user thereby delayed, such that the image of the local user thereby delayed is shown locally at the same time as the image of the local user shown remotely.

8 Claims, 5 Drawing Sheets

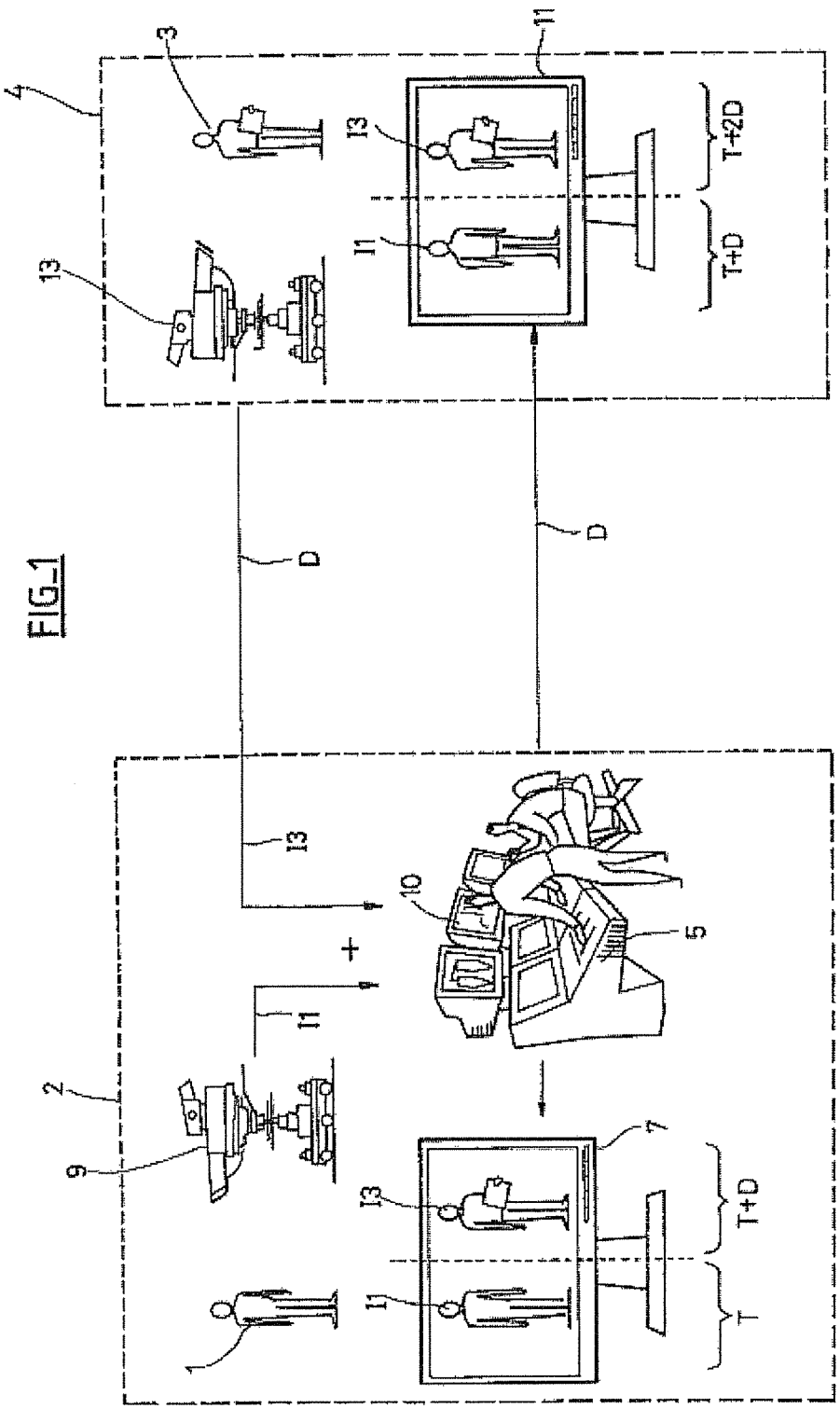

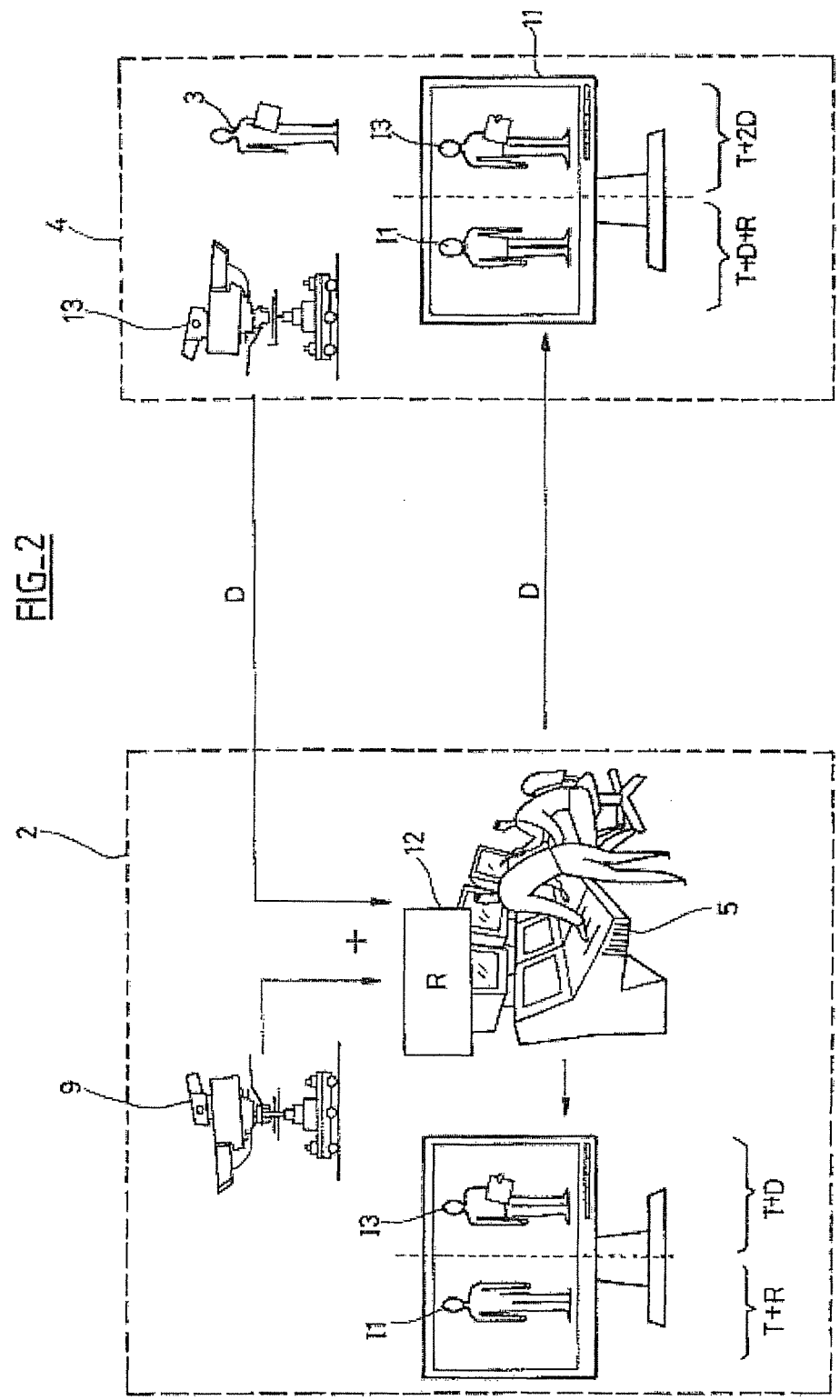
FIG_2

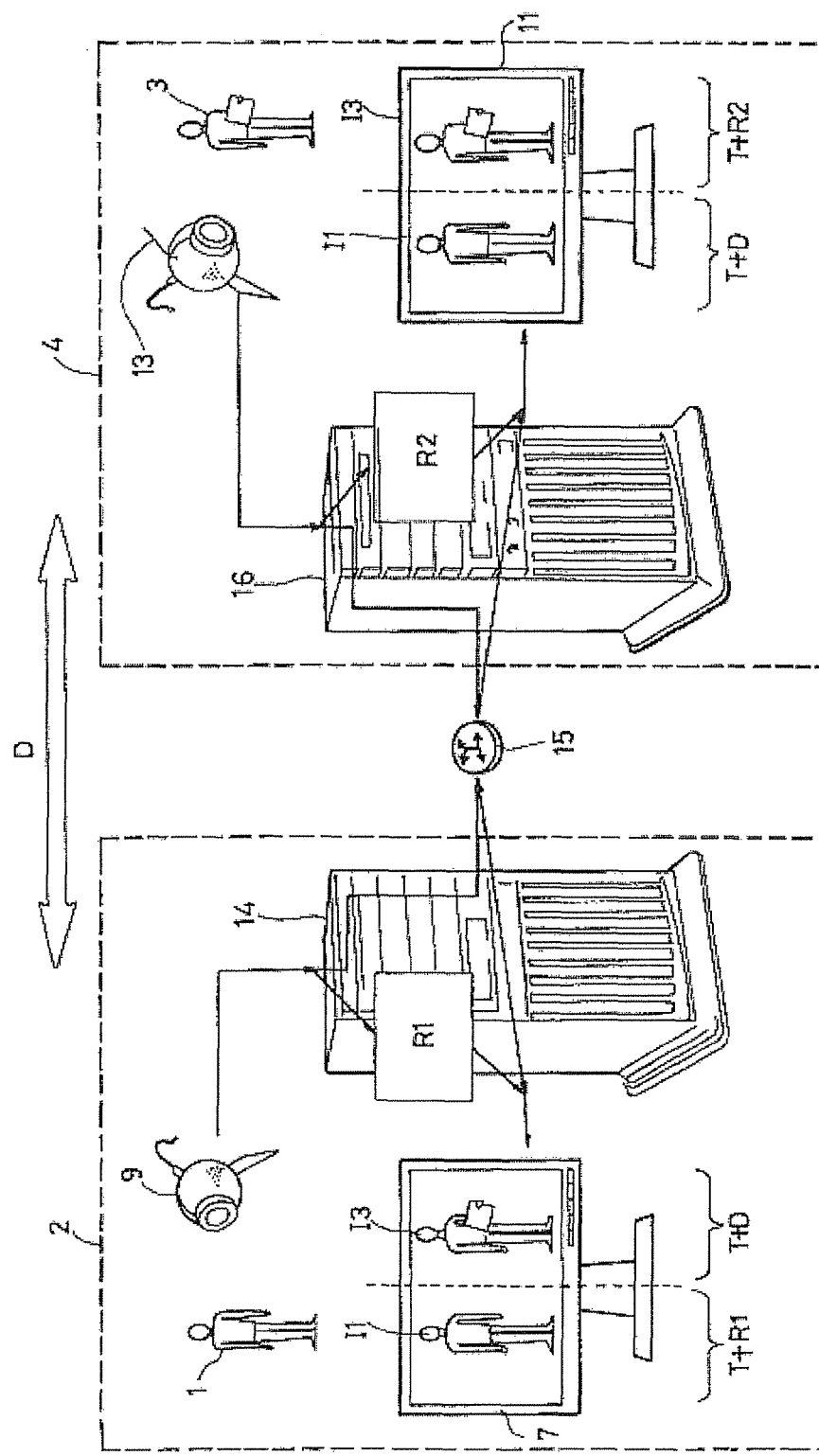
FIG_3

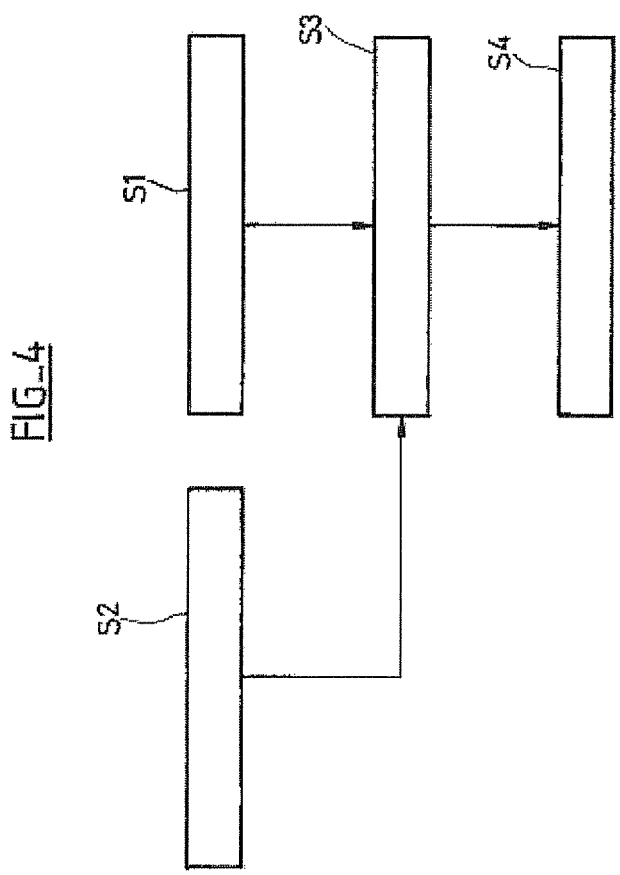

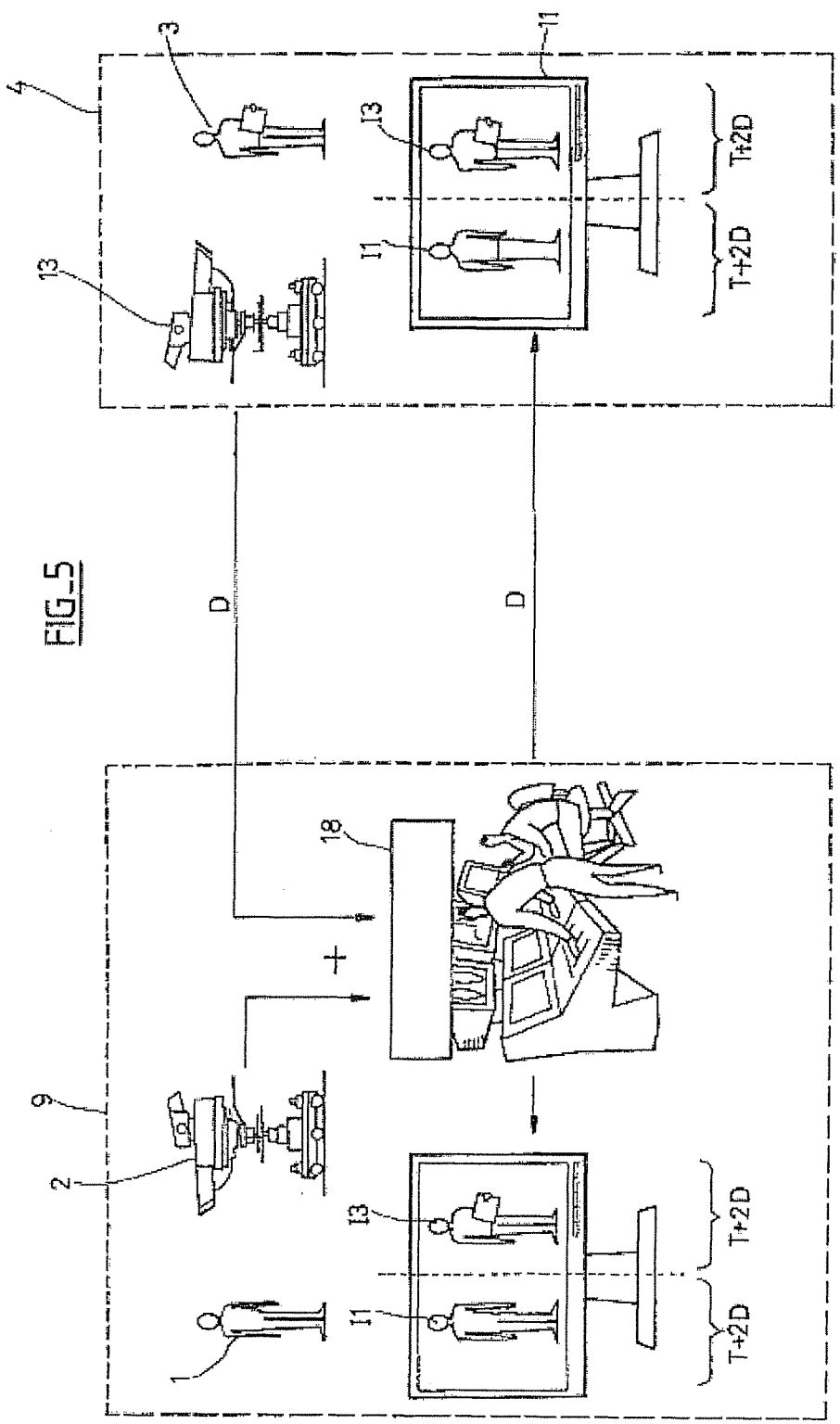

VIDEOCONFERENCING COMMUNICATION DEVICE AND METHOD

The present invention pertains to videoconferencing communications.

In general, videoconferencing enables a local user to communicate by voice and sight with at least one remote user. To that end, each user uses at least one screen which shows the image of the user to him or her, and the camera to capture his or her own image for the benefit of the other user.

If users are separated from one another by a long distance, videoconferencing communications, in particular those that use satellites, suffer from a relatively high non-synchronization problem between the users. This is because the local user's image arrives at the remote user's location after a period of time that may be relatively long depending on the communication network used, the encoding of the images, the distance, and the voice and image propagation speed between the users. The result is a negative feeling that the users are not speaking to one another naturally and interactively, which inhibits quality communication between the users.

The present invention provides a solution to this problem.

It discloses a videoconferencing communication device between a local user and at least one remote user comprising a local screen capable of displaying to the local user an image of the remote user and a local image sensor capable of capturing an image of the local user for the benefit of the remote user.

According to one general definition of the invention, the device further comprises a local delaying unit capable of applying a chosen delay to the image of the local user coming from the local image sensor, the local screen being capable of displaying to the local user the image of the local user thereby delayed so that the image of the local user thereby delayed is displayed locally at the same moment as the image of the local user displayed remotely.

Thus, owing to the inventive device, the negative feeling of non-synchronization is eliminated, because the local user has a local view of his or her own image as it is displayed remotely, which enables him or her to implement quality videoconferencing communication.

According to one embodiment, the delay is calculated as a function of technical characteristics of elements belonging to the group formed by the communication network, the encoding of the images, the distance, and the voice and image propagation speed, and/or the transmission time experienced.

According to another embodiment, the delay is calculated based on the round-trip transmission time between the local user and a remote user.

According to yet another embodiment, the delay is calculated in real time, dynamically, permanently, or at a given pace.

According to yet another embodiment, the image is displayed locally additionally taking into account the quality of the transmission, which make it possible to locally view one's own image as it is displayed remotely not only at the same time but also with the same quality, which further improves the feeling of immersion.

According to yet another embodiment, the device further comprises a superimposing unit capable of superimposing the image of the local user thereby delayed with the image of the local user without a delay, which enables the local user to adapt his or her behavior as a function of the discrepancy between the images of the local user with and without a delay.

According to yet another embodiment, the device further comprises a processing unit capable of converting the sound echo existing within the sound's transmission and/or transmission lag between a local user and a remote user, into a visual or vibrational representation. This is also an advantage in audioconferencing.

Another objective of the present invention is a videoconferencing communication method between a local user and at least one remote user, wherein it is provided to equip the local user with a local screen capable of displaying to the local user an image of the local user and with a local image sensor capable of capturing an image of the local user for the benefit of the remote user.

According to another aspect of the invention, the method further comprises the step wherein a chosen delay is locally applied to the image of the local user coming from the local image sensor, and the image of the local user thereby delayed is displayed to the local user, such that the image of the local user thereby delayed is displayed locally at the same time as the image of the local user displayed remotely.

According to yet another embodiment, the remote user is equipped with another communication device comprising a remote screen capable of displaying an image of the local user to the remote user, a remote image sensor capable of displaying an image of the remote user for the benefit of the local user, and a remote delaying unit capable of applying a chosen delay to the image of the remote user coming from the remote image sensor, and wherein the image of the remote user thereby delayed is displayed to the remote user, such that the image of the remote user thereby delayed and displayed to the remote user at a given moment matches the image of the remote user displayed to the local user at said moment.

Other characteristics and advantages of the invention will become apparent upon examining the detailed description below, and the attached drawings, wherein:

FIG. 1 schematically depicts a videoconferencing communication between two users separated from one another by a long distance according to the prior art;

FIG. 2 schematically depicts the videoconferencing communication of FIG. 1 wherein a delay is applied to the image of the local user in accordance with the invention;

FIG. 3 illustrates in detail one variant embodiment of the inventive device;

FIG. 4 is a flowchart illustrating the inventive method, and

FIG. 5 schematically depicts the videoconferencing communication of FIG. 2 wherein the applied delay matches the round-trip time between the users.

With reference to FIG. 1, a videoconferencing communication is established between a local user 1 located at a site 2 and a remote user 3 located at a site 4 very far from the site 2, for example several thousands of kilometers away. In one variant, the videoconferencing communication is established between the local user 1 and multiple remote users 3. The videoconferencing communication is established with the assistance of a communication device 5 whose processing means 10 are here located at the site 2. In one variant, the processing means 10 of the communication device 5 may be located at a different site, such as the site 4.

At the site 2, the communication device 5 comprises a screen 7 capable of displaying, to the local user 1, an image I3 of the remote user 3 with a lag D. The lag D here is a function of the communication network used, the encoding of the images, the distance, and the propagation speed of voice and images between the two sites 2 and 4. The device 5 further comprises a camera 9 which is capable of capturing the image I1 of the local user 1 for the benefit of the remote user 3. The screen 7 is also capable of displaying the image I1 of the local user 1 coming from the camera 9, at the reference time T.

At the site 4, a screen 11 makes it possible to display to the remote user 3 the image I1 of the local user coming from the communication device 5. The image I1 is displayed with a lag D that is a function of the communication network used, the encoding of the images, the distance, and the propagation speed of voice and images between the users. The screen 11 also displays the image of the remote user 3 captured by a camera 13 located at the site 4. This image I3 is displayed via the device 5 at a time equal to T+D on the screen 7 and at a time equal to T+2D on the screen 11.

Thus, the communication device of the prior art suffers from a problem of relatively high non-synchronization between the users. This is because the image of the local user I1 arrives at the remote user's location after a lag D that may be relatively long, without the local user being aware of the lag D. The result is a negative feeling that the users are not speaking to one another naturally and interactively, which inhibits quality communication between the users.

With reference to FIG. 2, the device 5 further comprises a local delaying unit 12 capable of applying a chosen delay R to the image of the local user I1 coming from the local image sensor 9.

The local screen 7 then displays to the local user the image of the local user I1 thereby delayed at the time equal to T+R, while the remote screen 11 displays to the remote user the image of the local user I1 at the time equal to T+R+D, where D is the communication lag between the two sites.

The delay R is chosen such that the image of the local user I1 thereby delayed is locally displayed on the screen 7 at the same time as the locally displayed image of the remote user. In other words, the delay R is chosen so that the images I1 whose time is equal to T+R and I3 whose time is equal to T+D displayed on the screen 7 are synchronized, here meaning T+R=T+D.

Likewise, the delay R here is chosen such that the image of the local user I1 thereby delayed and displayed at a time equal to T+D+R on the screen 11 is synchronous with the image of the remote user displayed on the screen 11 at the time equal to T+2D, here meaning T+R+D=T+D+D.

With reference to FIG. 3, the communication device comprises at a site 2 a delaying unit 14 capable of applying to the image of the user I1 coming from the image sensor 9 a chosen delay R1 and at the site 4, connected to the site 2 via a communication network 15, a delaying unit 16 capable of applying a delay R2 to the image of the user I3 coming from the image sensor 13.

The delays R1 and R2 are chosen such that the images I1 and I3 are synchronous on the screen 7 and 11, meaning here that T+R1=T+D=T+R2.

With reference to FIG. 4, the main steps of the videoconference communication method are as follows.

In step S1, video acquisition is performed using the image sensors 9 and 13.

In step S2, the delay R and/or delays R1 and R2 are estimated.

For example, the delay is estimated by measuring the difference in time between the moment when an image is sent from the local site to the remote site. For example, this measure is performed on RTP (Real-time Transport Protocol) packets, and the clocks are synchronized with the NTP (Network Time Protocol) signal.

In one variant, the delay is estimated by measuring the difference in time between the moment when a probe's packets arrive and are sent, for example using the protocols UDP (User Datagram. Protocol) or ICMP (Internet Control Message Protocol).

In practice, the delay is calculated in real time, dynamically, permanently, or at a given pace.

In step S3, the delays thereby estimated are applied to the images acquired during the step S1.

In practice, the delay is applied by storing in memory the packets intended for the full screen for a duration corresponding to the transmission lag D.

In one variant, the delay is applied by altering the time labels of the packets to be sent to the device decoding the images.

In practice, the image is displayed locally, taking into account, besides the transmission quality (bitrate, error rate, etc.), which makes it possible to locally have its own image as it is displayed remotely not just at the same time but also with the same quality.

In step S4, the step of displaying the images on the screens 7 and 11 is performed.

For example, in order to further improve the quality of the videoconference, the device further comprises a superimposing unit capable of superimposing on each screen 7 and 11 the image of the user thereby delayed with the image of the user without a delay, which enables the user to adapt his or her behavior as a function of the discrepancy between the images of the user with and without a delay.

According to yet another embodiment, the device further comprises a processing unit capable of converting the sound echo existing within the sound's transmission and/or transmission lag between a local user and a remote user, into a visual or vibrational representation.

With reference to FIG. 5, the delaying unit 18 applies a delay R whose value is calculated as a function of the round-trip transmission lag between the two sites, here R=2D.

Thus, the images I1 and I3 shown on the screen 7 are synchronous and displayed at a time equal to T+2D. Likewise, the images I1 and I3 shown on the screen 11 are synchronous and displayed at a time equal to T+2D.

The invention claimed is:

1. A videoconferencing device configured to enable a videoconference between a local user and at least one remote user, the device comprising:
    a local image sensor capable of capturing a non-delayed local image of the local user to transmit to the remote user as a transmitted local image;
    a delaying unit capable of applying a chosen delay to the non-delayed local image of the local user generated by the local image sensor to produce a delayed local image such that a timing, at the local user of the delayed local image is same as a timing, at the remote user, of the transmitted local image;
    a superimposing unit configured to superimpose the non-delayed local image with the delayed local image to produce a superimposed image; and
    a screen configured to simultaneously display to the local user an image of the remote user and the superimposed image containing the non-delayed local image and the delayed local image such that discrepancies between the non-delayed local image and the delayed local image are visible to the local user.

2. A device according to claim 1, wherein the delay is calculated as a function of technical characteristics of elements belonging to the group formed by the communication network, the encoding of the images, the distance, and the voice and image propagation speed, and/or the transmission time experienced.

3. A device according to claim 1, wherein the delay is calculated according to the round-trip transmission lag between the local user and the remote user.

4. A device according to claim 1, wherein the delay is calculated in real time, dynamically, permanently, or at a given pace.

5. A device according to claim 1, wherein the delayed local image of the local user is shown locally, additionally taking into account a bitrate or error rate of the transmission between the local user and the remote user.

6. A device according to claim 1, wherein the device further comprises:
- a processing unit capable of converting a sound echo existing within sound transmission between a local user and a remote user, into a visual or vibrational representation.

7. The device according to claim 1, wherein the remote user is equipped with another communication device, the another communication device comprising:
- a remote image sensor capable of capturing a non-delayed remote image of the remote user to transmit to the local user as a transmitted remote image;
- a remote delaying unit capable of applying a chosen delay to the non-delayed remote image of the remote user generated by the remote image sensor to produce a delayed remote image such that a timing, at the remote user of the delayed local image is same as a timing, at the local user, of the transmitted remote image;
- a superimposing unit configured to superimpose the non-delayed remote image with the delayed remote image to produce a superimposed remote image; and
- a screen configured to simultaneously display to the remote user an image of the local user and the superimposed image containing the non-delayed remote image and the delayed remote image such that discrepancies between the image of the non-delayed remote image and the delayed remote image are visible to the remote user.

8. A method of performing a videoconference between a local user and at least one remote user, the method comprising:
- capturing, by a local image sensor, a non-delayed local image of the local user to transmit to the remote user as a transmitted local image;
- applying a chosen delay to the non-delayed local image of the local user generated by the local image sensor to produce a delayed local image such that a timing, at the local user of the delayed local image is same as a timing, at the remote user, of the transmitted local image;
- superimposing the non-delayed local image with the delayed local image to produce a superimposed image; and
- simultaneously displaying to the local user an image of the remote user and the superimposed image containing the non-delayed local image and the delayed local image such that discrepancies between the non-delayed local image and the delayed local image are visible to the local user.

* * * * *